(12) United States Patent
Hasan et al.

(10) Patent No.: US 9,369,029 B2
(45) Date of Patent: Jun. 14, 2016

(54) ROTATING RECTIFIER ASSEMBLY FOR ELECTRIC MACHINE

(71) Applicant: GE Aviation Systems LLC, Grand Rapids, MI (US)

(72) Inventors: Raed Zuhair Hasan, Englewood, OH (US); Xiaochuan Jia, Centerville, OH (US); Kerry Steven Reynolds, Union, OH (US); Hao Huang, Troy, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 530 days.

(21) Appl. No.: 13/778,516

(22) Filed: Feb. 27, 2013

(65) Prior Publication Data

US 2014/0239777 A1 Aug. 28, 2014

(51) Int. Cl.
*H02K 11/00* (2006.01)
*H02K 41/035* (2006.01)
*H02K 15/02* (2006.01)

(52) U.S. Cl.
CPC ........ *H02K 11/0073* (2013.01); *H02K 41/0356* (2013.01); *H02K 15/02* (2013.01)

(58) Field of Classification Search
CPC ... H02K 11/00; H02K 11/0073; H02K 15/02; H02K 41/0356
USPC ............... 257/E23.078, E25.024; 363/145
IPC ..................................................... H02K 11/00
See application file for complete search history.

(56) References Cited

U.S. PATENT DOCUMENTS

| 3,348,127 | A | | 10/1967 | Petersen | |
|---|---|---|---|---|---|
| 3,721,843 | A | * | 3/1973 | Spisak et al. | H01L 25/10 257/E25.022 |
| 4,745,315 | A | | 5/1988 | Terry, Jr. et al. | |
| 5,001,376 | A | | 3/1991 | Iseman | |
| 5,012,145 | A | * | 4/1991 | Frantz | H01L 25/115 257/E25.026 |
| 5,414,318 | A | | 5/1995 | Shimizu et al. | |
| 5,796,196 | A | * | 8/1998 | Johnsen | H01L 25/112 257/E25.025 |

(Continued)

FOREIGN PATENT DOCUMENTS

| EP | 1788693 B1 | 9/2009 |
|---|---|---|
| GB | 1183291 A | 2/1968 |

(Continued)

OTHER PUBLICATIONS

Deniss Moss et al. "Pressure Vessel Design Manual, 4th Ed.", Butterworth-Heinemann, p. 456, 2013.*

(Continued)

*Primary Examiner* — John K Kim
(74) *Attorney, Agent, or Firm* — GE Global Patent Operation; William S. Munnerlyn (57) ABSTRACT

An electric machine having a rectifier assembly placed within a rotating shaft of the electric machine to convert the AC output of the electric machine to DC prior to transmission of the electricity from the electric machine.

23 Claims, 6 Drawing Sheets

(56) References Cited

U.S. PATENT DOCUMENTS

| | | | |
|---|---|---|---|
| 6,903,470 B2 | 6/2005 | Doherty et al. | |
| 7,166,943 B2 * | 1/2007 | Johnsen | H01L 24/72 257/E23.078 |
| 7,944,100 B2 * | 5/2011 | Lemmers, Jr. | H02K 11/042 29/592.1 |
| 2003/0164651 A1 | 9/2003 | Tornquist et al. | |
| 2007/0108854 A1 * | 5/2007 | Osborn | H02K 11/042 310/68 D |
| 2010/0019628 A1 | 1/2010 | Kitzmiller et al. | |
| 2010/0054005 A1 * | 3/2010 | Grosskopf | H02K 11/042 363/126 |
| 2010/0283357 A1 | 11/2010 | Lemmers, Jr. et al. | |
| 2011/0296672 A1 | 12/2011 | Ganong et al. | |
| 2014/0239777 A1 * | 8/2014 | Hasan | H02K 11/0073 310/68 D |

FOREIGN PATENT DOCUMENTS

| | | |
|---|---|---|
| GB | 1183291 A | 3/1970 |
| GB | 1507755 A | 4/1978 |
| GB | 2015252 A | 9/1979 |
| JP | 2005320086 A | 11/2005 |
| WO | 9013144 A1 | 11/1990 |

OTHER PUBLICATIONS

GB Combined Search and Examination Report issued in connection with corresponding Application No. GB1403209.8 on Aug. 29, 2014.
GB Combined Search and Examination Report issued in connection with corresponding Application No. GB1403209.8 on Augus.
Written Opinion for PCT/US2013/043814 dated Mar. 4, 2014.

* cited by examiner

ROTATING RECTIFIER ASSEMBLY FOR ELECTRIC MACHINE

BACKGROUND OF THE INVENTION

Electric machines, such as electric motors and/or electric generators, may be used in the generation of electricity. In the aircraft industry, it is common to find combination motors/generators, where the motor is used to power the generator, and, depending on the configuration, functions as a generator, too. Regardless of the configuration, generators typically include a generator rotor having main windings that are driven to rotate by a source of rotation, such as an electrical or mechanical machine, which for some aircraft may be a gas turbine engine. In some applications, the generators initial generate alternating current (AC), which is rectified to generate direct current (DC) for DC components on the aircraft.

BRIEF DESCRIPTION OF THE INVENTION

In one aspect, a rectifier assembly for placement within a rotating shaft of an electric machine assembly having a first machine providing an alternating current output and a second machine receiving a direct current input, with the rectifier assembly converting the alternating current output to the direct current input. The rectifier assembly includes opposing first and second conductive segments, opposing first and second non-conductive segments coupling the first and second conductive segments to collectively define an annular rectifier structure defining an interior, with the first and second conductive segments and the first and second non-conductive segments radially spaced about the annular rectifier structure, a set of diode seats provided on each of the first and second conductive segments so as to face the interior, with a diode seat in one set being paired with a diode seat in the other set to define pairs of diode seats, a biasing element overlying each of the diode seats, and a non-conductive support for each of the diode seats and holding the biasing element in position relative to the diode seat. A diode seated on the diode seat is biased by the biasing element against the diode seat and held in place by the non-conductive support.

In another aspect, a rectifier assembly for placement within a rotating shaft of an electric machine assembly having a first machine providing an alternating current output and a second machine receiving a direct current input, with the rectifier assembly converting the alternating current output to the direct current input. The rectifier assembly includes multiple conductive segments, multiple non-conductive segments interposed between the multiple conductive segments to electrically separate the conductive segments and to form a rectifier structure with an interior, a set of diode seats provided on each of the conductive segments so as to face the interior, a biasing element overlying each of the diode seats, and a non-conductive support for each of the diode seats and holding the biasing element in position relative to the diode seat. A diode seated on the diode seat is biased by the biasing element against the diode seat and held in place by the non-conductive support.

DESCRIPTION OF EMBODIMENTS OF THE INVENTION

Embodiments of the invention may be implemented in any environment using an electric motor regardless of whether the electric motor provides a driving force and/or generates electricity. For purposes of this description, such an electric motor will be generally referred to as an electric machine, electric machine assembly, or similar language, which is meant to make clear that one or more stator/rotor combinations may be included in the machine. While this description is primarily directed toward an electric machine providing power generation, it is also applicable to an electric machine providing a driving force and/or an electric machine providing both a driving force and power generation. Further, while this description is primarily directed toward an aircraft environment, embodiments of the invention are applicable in any environment using an electric machine.

Figure 1:
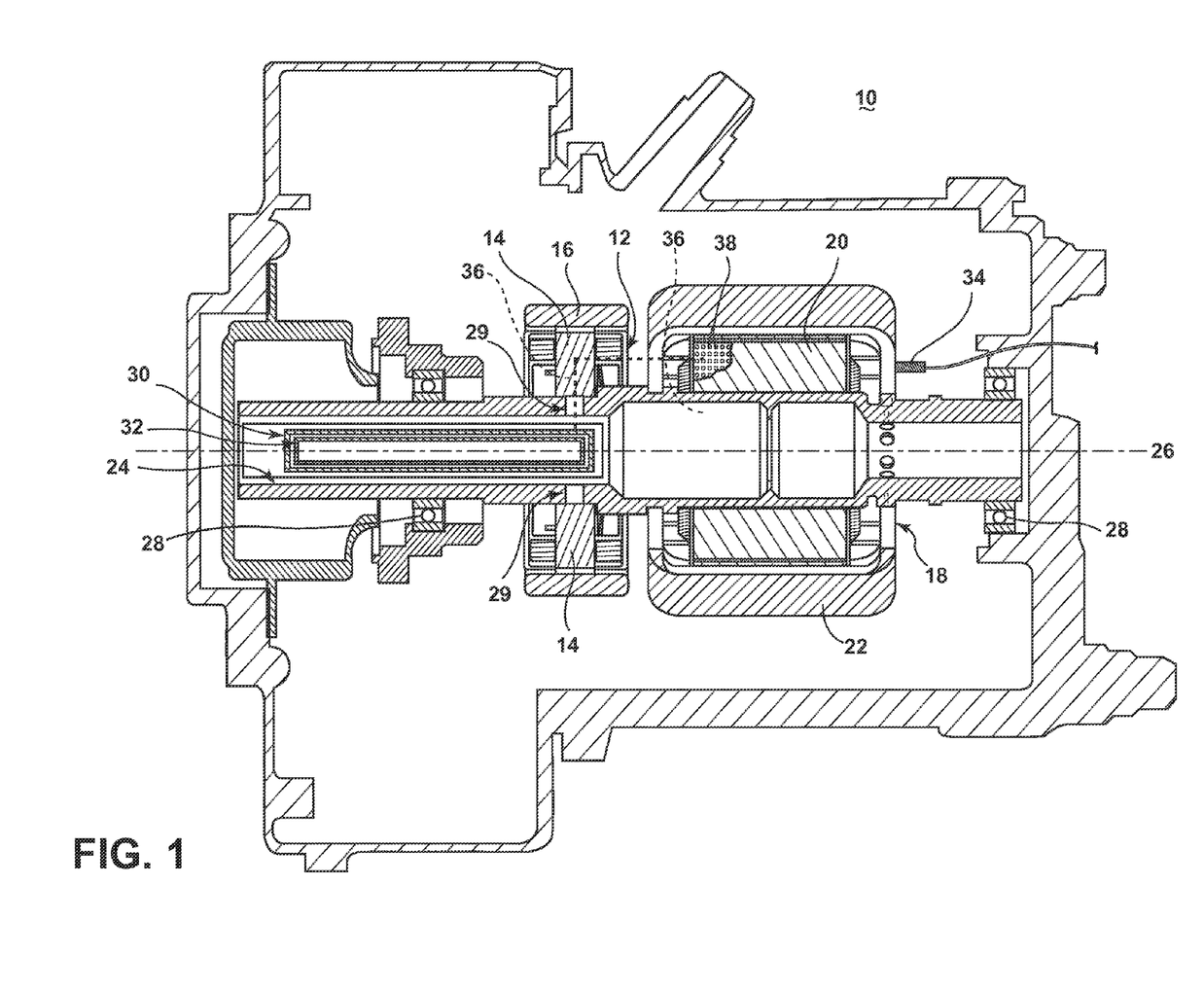
FIG. 1 is a sectional view of an electrical machine assembly.

Turning to an exemplary embodiment of the invention, FIG. 1 schematically illustrates an electrical machine assembly 10 comprising a first machine 12 having an exciter rotor 14 and an exciter stator 16, and a second machine 18 having a main machine rotor 20 and a main machine stator 22. At least one power connection is provided on the exterior of the electrical machine assembly 10 to provide for the transfer of electrical power to and from the electrical machine assembly 10. Power is transmitted by this power connection, shown as an electrical power cable 34, to the electrical load and may provide for a three phase with a ground reference output from the electrical machine assembly 10.

The electrical machine assembly 10 further comprises a rotatable shaft 24 mechanically coupled to a source of axial rotation, which may be a gas turbine engine (not shown), about a common axis 26. The rotatable shaft 24 is supported by spaced bearings 28 and includes access openings 29 radially spaced about the shaft 24. The exciter rotor 14 and main machine rotor 20 are mounted to the rotatable shaft 24 for rotation relative to the stators 16, 22, which are rotationally fixed within the electrical machine assembly 10. The stators 16, 22 may be mounted to any suitable part of a housing portion of the electrical machine assembly 10.

The rotatable shaft 24 further comprises at least a hollow portion for enclosing a shaft tube 30, which is contemplated to be non-conducting. The shaft tube 30 is rotationally coupled for co-rotating with the rotatable shaft 24 and further houses a rectifier assembly 32, insulating the rectifier assembly 32 from the rotatable shaft 24.

The exciter rotor 14 is electrically connected to the rectifier assembly 32 by way of conductors 36 (schematically shown as dotted lines). Additionally, the rectifier assembly 32 is electrically connected to the main windings 38 of the main machine rotor 20 by way of conductors 36.

Figure 2:
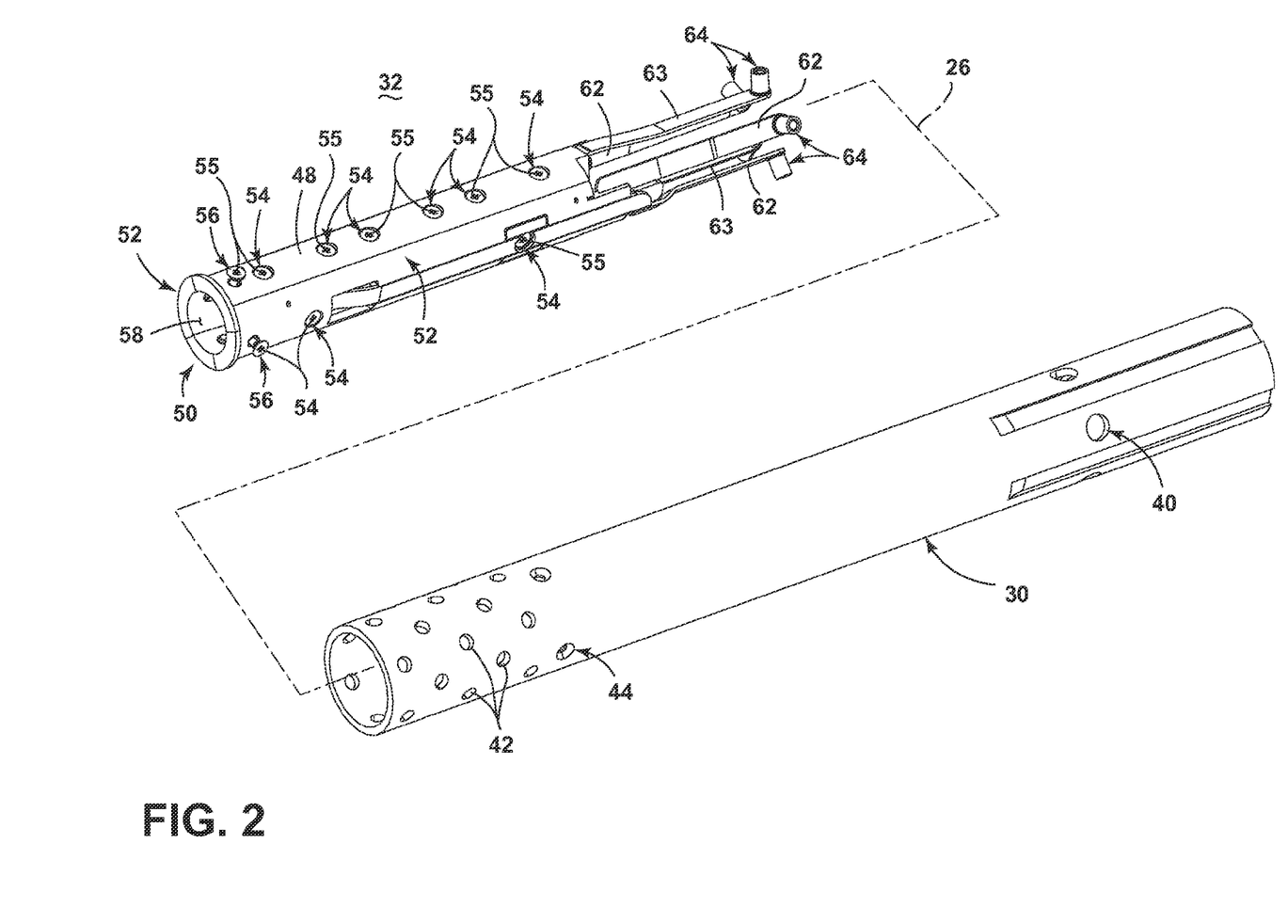
FIG. 2 is a perspective view of the rectifier assembly and the shaft tube.

Turning now to FIG. 2, the details of shaft tube 30 and the rectifier assembly 32 will be described. The shaft tube 30 has a substantially cylindrical structure with opposing open ends, and includes five mounting connector openings 40 spaced radially near the aft of the tube 30. The shaft tube 30 is also shown having optional access openings 42, some of which may be radially aligned for accessing portions of the rectifier assembly 32. The shaft tube 30 further comprises anchor fastener openings 44.

The rectifier assembly 32 comprises an outer structure having opposing, axially extending conductive segments, such as electrical segments 48, 50, and opposing non-conductive segments, such as isolating segments 52, that electrically isolate at least a portion of the adjacent electrical segments 48, 50. Each of the segments 48, 50, 52 is shown having a substantially arcuate cross section. The electrical segments 48, 50 may be made of any suitable conductive material. Additionally, the isolating segments 52 may be made of any suitable non-conductive material. The illustrated embodiment shows an assembled first electrical segment 48, a second electrical segment 50, and two isolating segments 52 coupled in a radially alternating, adjacent placement. The assembled segments 48, 50, 52 collectively define an axially extending, annular rectifier structure defining an axially extending interior. Alternate placement of the electrical segments 48, 50 and the isolating segments 52 are envisioned.

Each electrical segment 48, 50 and isolating segment 52 further comprises mechanical fastener openings 54 for receiving mechanical fasteners 55. Additionally, as shown, each of the first and second electrical segments 48, 50 further comprises anchor fastener bases 56 for receiving fasteners 55. The anchor fastener bases 56 and anchor fastener openings 44 are configured such that when the shaft tube 30 and the rectifier assembly 32 are assembled, the fastener bases 56 and fastener openings 44 are axially and radially aligned to receive a fastener 55 through fastener opening 44 into the fastener base 56. The coupling of the fastener 55 with the fastener base 56 occurs in such a way that the rectifier assembly 32 and the shaft tube 30 may not rotate independently. Alternate numbers and placement of the anchor fastener openings 44 and anchor fastener bases 56 are envisioned.

The assembled electrical segments 48, 50 and isolating segments 52 at least partially define an axial coolant passage 58, extending axially along the interior of the assembled segments 48, 50, 52. The axial coolant passage 58 allows coolant to flow through the interior of the rectifier assembly 32. Alternate configurations of the coolant passage 58 are envisioned to allow for passages extending axially along the exterior of the assembled segments 48, 50, 52, as well as radial openings in the segments 48, 50, 52 allowing for coolant to traverse the interior and exterior of the rectifier assembly 32.

The rectifier assembly 32 further comprises conducting AC bus bars 62 and DC bus bars 63, shown radially spaced about the rectifier assembly 32 axis. The bus bars 62, 63 comprise a first end having mounting connectors 64 for securing the AC and DC bars 62, 63 to the respective first and second machines 12, 18 by way of conductors 36. The AC bus bars 62 receive the input AC voltage from the first machine and the DC bus bars 63 deliver the output DC voltage from the rectifier assembly 32. As illustrated, the mounting connectors 64 are formed simultaneously and conjoined with the first end of the bus bars 62, 63. Alternatively, a fastener, such as a screw may be provided to aid in the mounting of the mounting connectors 64 to the first end of the bus bars 62, 63. Alternatively, non-mechanical fasteners, such as welding or adhesive may also be used.

The mounting connectors 64 and mounting connector openings 40 are configured such that, when the shaft tube 30 and the rectifier assembly 32 are assembled, the connectors 64 are received by the openings 40 to provide for electrical coupling between the AC connectors 64 and the first machine 12, and the DC connectors 64 and the second machine 18.

Figure 3:
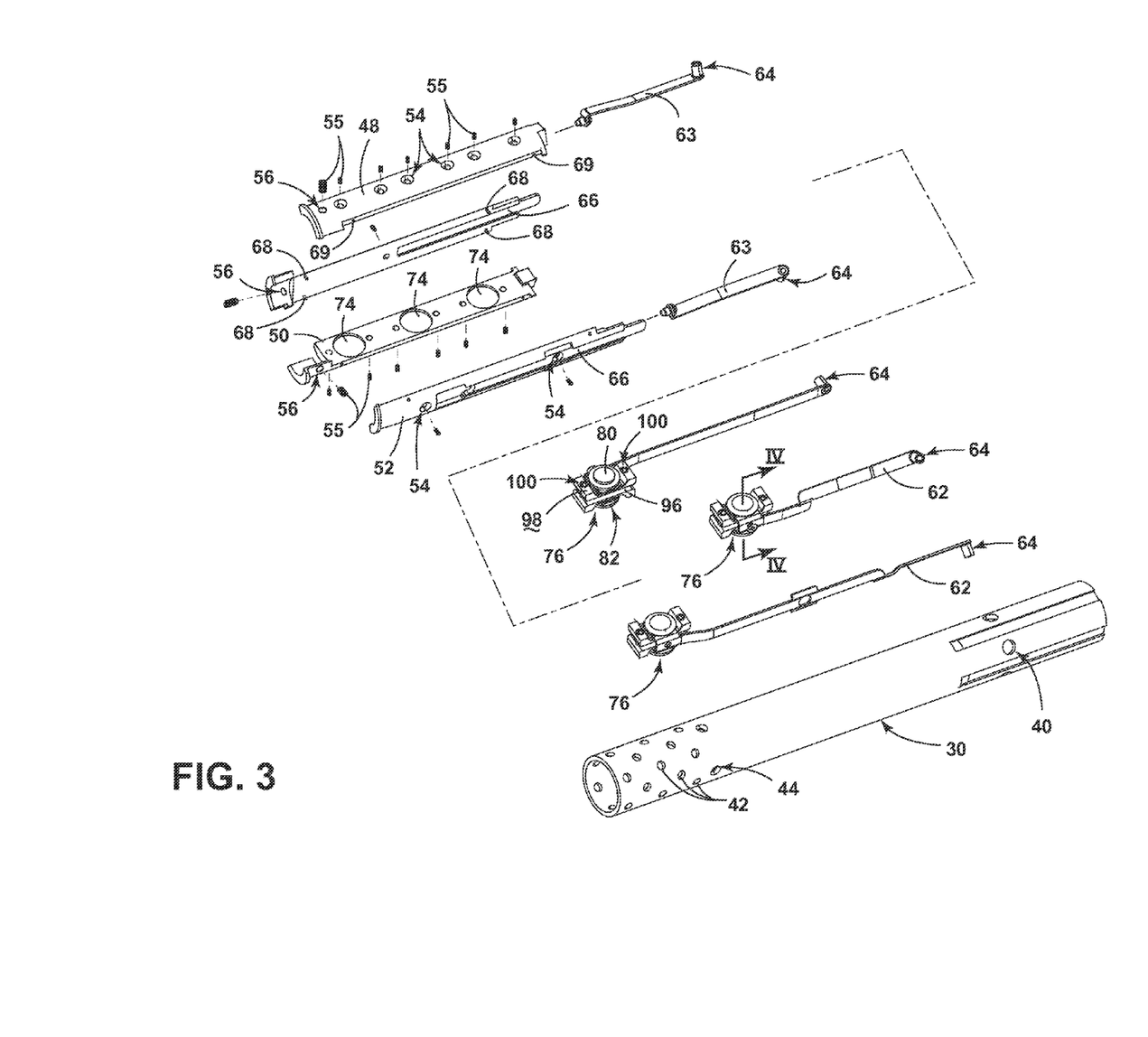
FIG. 3 is an axially exploded view of the rectifier assembly and shaft tube.

FIG. 3 illustrates an exploded perspective view of the rectifier assembly, exploded along the common axis 26. As illustrated, one of the DC bus bars 63 is electrically coupled to one end of each of the respective first and second electrical segments 48, 50 by fasteners 55. The electrical coupling may be made by any conductive surface coupling or conductive suitable mechanical or non-mechanical fasteners. Alternate placement and coupling of the DC bus bars 63 to each electrical segment 48, 50 is envisioned. Additionally, as shown, the three AC bus bars 62 receive the respective three-phase AC output of the exciter rotor 14. Furthermore, the two DC bus bars 63 are used for the transmission of the DC output to the second machine 18. Alternate arrangements and quantities of AC and DC bus bars 62, 63 are envisioned based on the electrical machine assembly 10 needs and configuration.

The electrical segments 48, 50 and isolating segments 52 are shown with corresponding pins 68 and openings 69, allowing the segments 48, 50, 52 to mount to each other to allow for alignment and prevent independent rotation. Alternate physical or keyed pins 68 and openings 69 configurations allowing for proper alignment are envisioned.

The isolating segments 52 may further comprise surface grooves 66 which extend axially along the inner and outer surfaces for receiving the first, second, and third AC bus bars 62. When assembled, the placement and coupling of the AC bus bars 62 to the isolating segments 52 insulates each of the bars 62 from electrical contact with each other, as well as from the first and second electrical segments 48, 50. The AC bus bars 62 are shown having at least a portion of the bars 62 mounted to at least one of the isolating segments 52 by fasteners 55.

Each of the first electrical segment 48 and the second electrical segment 50 further comprise at least one diode seat 74 for receiving a diode 80, which is illustrated as being circular recessions within the internal face of the segments 48, 50. When assembled, the diodes 80 are axially spaced on the electrical segments 48, 50, however other locations and shapes are possible. With respect to first and second electrical segments 48, 50, one opposing diode seat 74 from each segment 48, 50 defines a pair of diode seats. Typically, the rectifier assembly 32 will include one pair of diode seats for each AC bus bar 62, but alternate configurations are envisioned.

The rectifier assembly is shown comprising diode assemblies 76, each having a diode set 82 including one forward-biased and one reversed-biased circular diodes 80. The diode assembly 76 comprises isolating supports 96 that electrically isolate at least a portion of the one AC bus bar 62 and diode 80 from adjacent bars 62. The supports 96 further comprise support ridge 98 on each axial end to define a recession for receiving each diode 80. The supports 96 may be made of non-conductive material. Each support 96 includes at least one threaded fastener opening 100 on each ridge 98 for receiving the fastener 55. In alternate mechanical fastener embodiments, the opening 100 would be replaced by a suitable mounting point.

Figure 4:
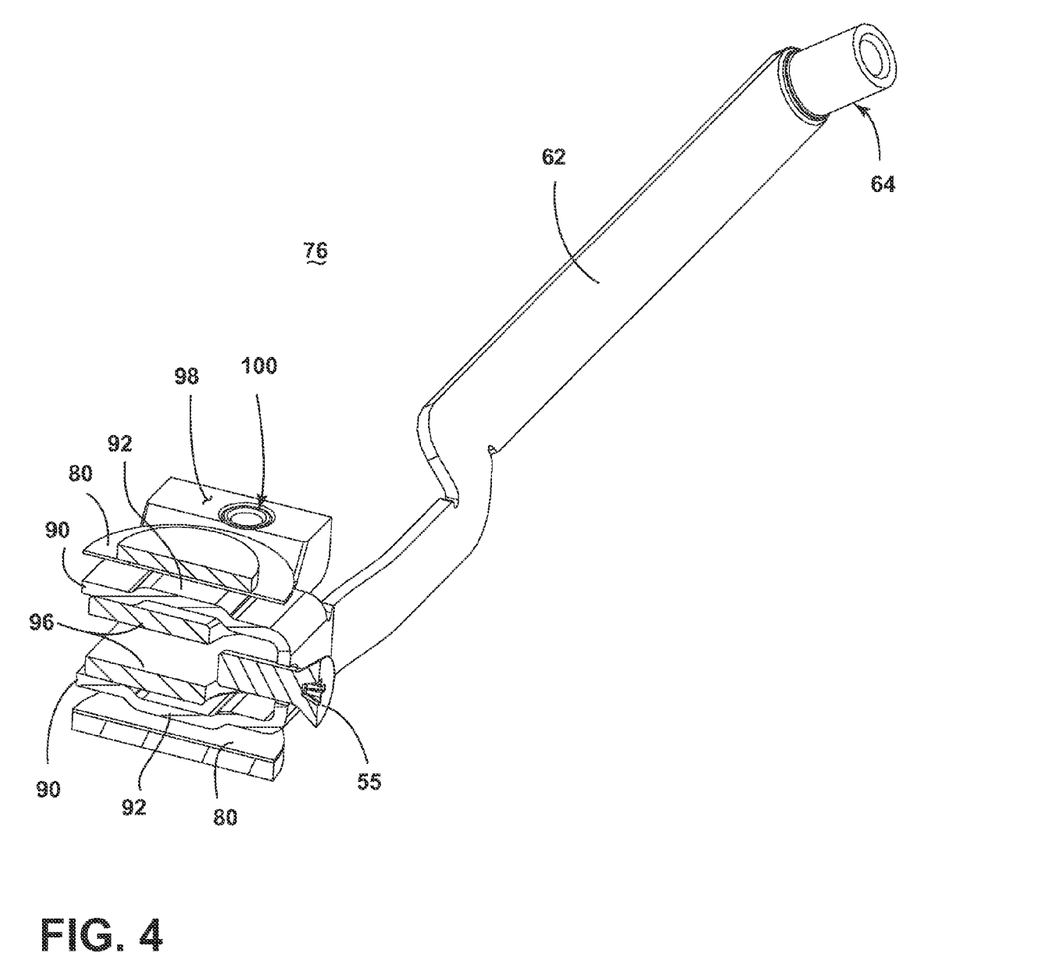
FIG. 4 is a perspective cross section view of the diode assembly taken along line 4-4 of FIG. 3.

Turning now to FIG. 4, the diode assembly 76 further comprises one end of each AC bus bars 62 having an opposing pair of integrated conductive terminal bars 90 having biasing elements, such as spring fingers 92. Each pair of terminal bars 90 is configured to correspond to a diode set 82. The terminal bars 90, as embodied, are formed cooperatively with each respective AC bus bars 62, but may alternately be formed or machined by any suitable conductive material electrically connected to the AC bus bars 62. The spring fingers 92 extend slightly normally outward, with a surface suitable for making conductive contact with one diode 80 from each diode set 82.

Alternate spring fingers 92 are envisioned for making conductive contact with the diodes 80.

The opening 100 of a support 96 are configured to correspond with the mechanical fastener openings 54 of the first and second electrical segments 48, 50. Likewise, the first electrical segment 48 diode seat 74 is configured to correspond with the forward-biased diodes 80 and one set of spring fingers 92 on each of the diode assemblies 76, and the second electrical segment 50 diode seat 74 is configured to correspond with the reverse-biased diodes 80 and the opposite set of spring fingers 92 on each of the diode assemblies 76.

The assembling of the diode assembly 76 will now be described in further detail. When the first and second electrical segments 48, 50 and the isolating segments 52 are adjoined, diodes 80 are overlain on the surface of each of the diode seat 74, such that the seat 74 of the first electrical segment 48 are overlain with the forward-biased diodes 80 and the seat 74 of the second electrical segment 50 are overlain with the reverse-biased diodes 80. Each diode set 82 is then overlain with one of the three terminal bars 90, such that the opposing spring fingers 92 overlay each of the opposing diodes 80, followed by each terminal bar 90 being overlain by a support 96. Finally, a fastener 55 is inserted into each mechanical fastener opening 54 of the first and second electrical segments 48, 50, and fastened into the opening 100 of the support 96.

The fastening of the fastener 55 into the opening 100 compresses the support 96 against the inner surface of the first and second electrical segments 48, 50, such that the spring fingers 92 clamp the diodes 80 radially against the segments 48, 50. The ridges 98 of each support 96 further restrict the diodes 80 axially, and the coupling between the first and second electrical segments 48, 50 to each isolating segments 52 restrict the diodes 80 radially, to prevent unintended electrical contacts from occurring. Thus, the diodes 80 are secured in a position relative to the diode seat 74.

The rectifier assembly 32 is further axially secured to the shaft tube 30 when the mounting connectors 64 are secured to the first and second machines 12, 18 through the mounting connector openings 40. Additionally, when fully assembled, at least a portion of the access openings 42 may align with the mechanical fastener openings 54 of the first electrical segment 48, second electrical segment 50, or isolating segments 52, allowing visual inspection and adjustment of the fastener 55.

During generator operation, the rotatable shaft 24 is driven by the source of axial rotation. The rotation of the mounted exciter rotor 14, adjacent to the exciter stator 16, generates a three-phase AC current, which is delivered to three respective AC input bus bars 62 by the conductors 36 and mounting connectors 64. Each phase of the AC current is transmitted from the bus bar 62 to one diode 80 from each forward and reversed-biased diode set 82. The diodes operate to rectify the full wave AC current to DC current. At zero or low RPMs of the rotatable shaft 24, the diodes 80 are compressively retained in place by the spring fingers 92 of the second end of the AC bus bars 62, as drawn against the diodes 80, to the diode seat 74 of the electrical segments 48, 50 by the fasteners 55. At higher RPMs, centrifugal force, in addition to the compressive force, help to retain the diodes 80 in place.

The reversed-biased diodes 80 outputs DC current to the first electrical segments 48 and the forward-biased diodes 80 outputs DC current to the second electrical segment 50. The two DC output currents are delivered to the respective DC output bus bars 63, where they are transmitted by the mounting connectors 64 and conductors 36 into the main windings 38 of the main machine rotor 20. The rotation of the main machine rotor 20 about the main machine stator 22 generates the electricity that is used to power the generator load.

During operation of the electrical machine assembly 10, the configuration of the axial coolant passage 58 allows for coolant to traverse the interior of the rectifier assembly 32, cooling any transient or steady-state temperature conditions that develop at the electrical segments 48, 50, the isolating segments 52, or the diode assembly 76. Alternate coolant configurations are envisioned.

Figure 5:
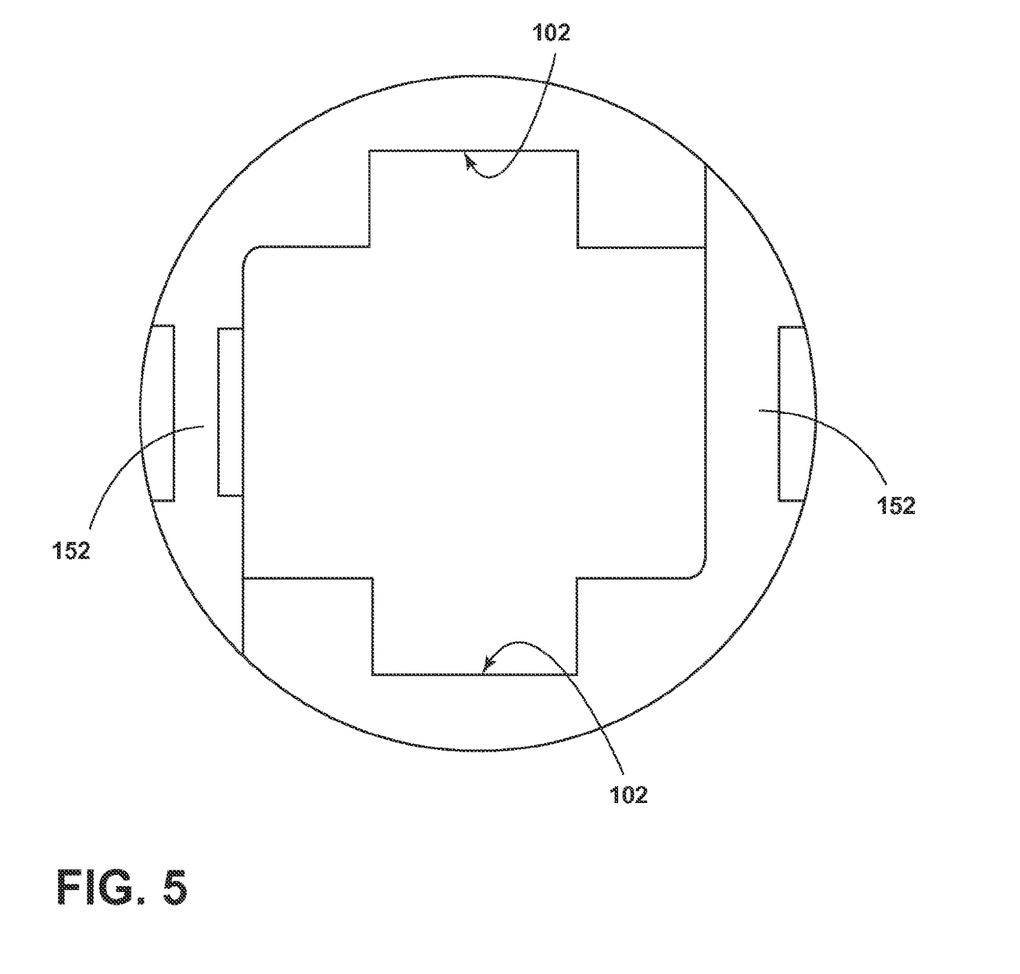
FIG. 5 is a cross sectional view according to a second embodiment of the invention.
Figure 6:
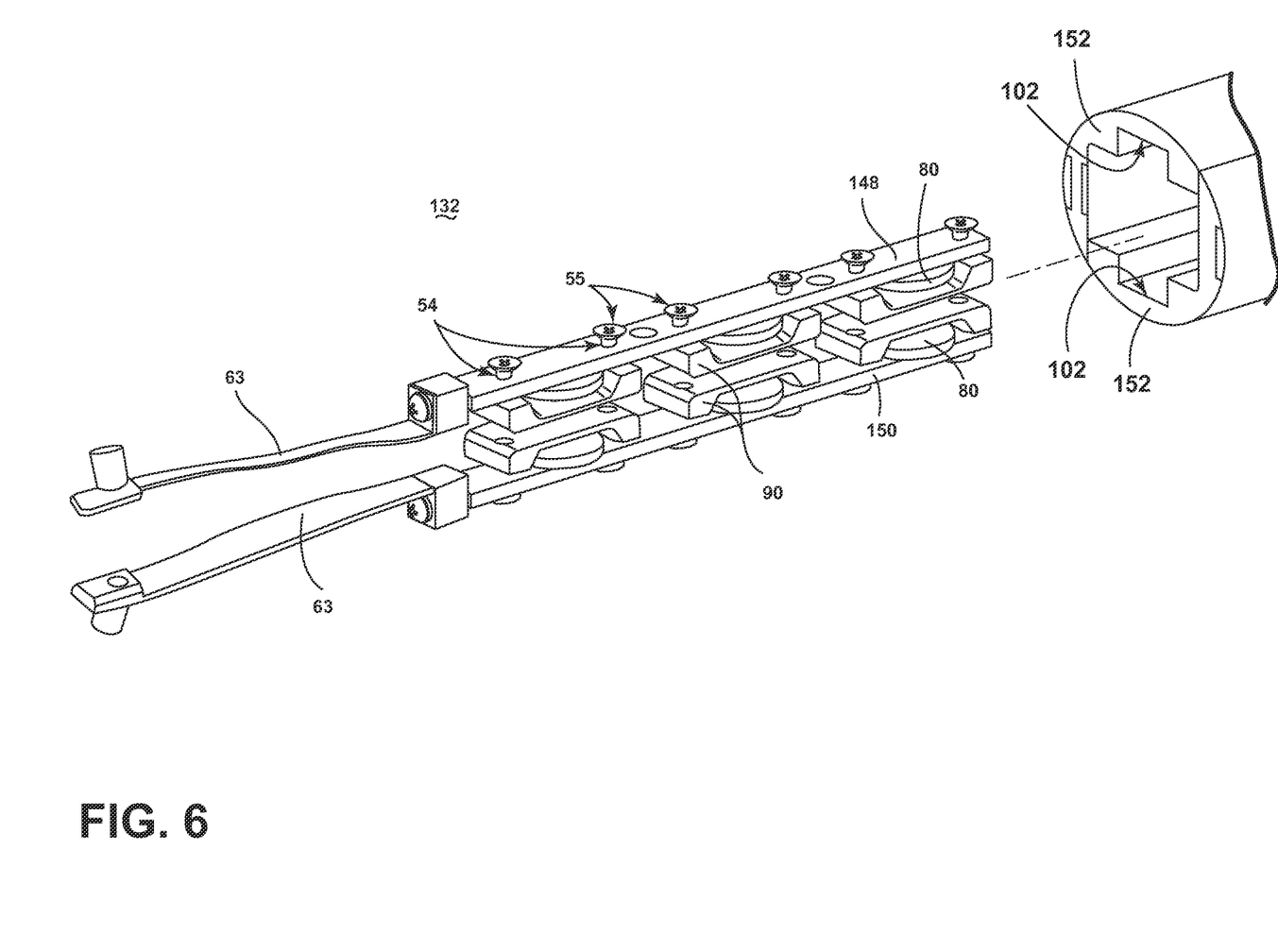
FIG. 6 is a perspective view of the rectifier assembly according to a second embodiment of the invention.

FIGS. 5 and 6 illustrate an alternative rectifier assembly 32 according to a second embodiment of the invention. The second embodiment is similar to the first embodiment; therefore, like parts will be identified with like numerals increased by 100, with it being understood that the description of the like parts of the first embodiment applies to the second embodiment, unless otherwise noted. A difference between the first embodiment and the second embodiment is that the isolating segments 152 form the entire outer structure of the rectifier assembly 132, while the electrical segments 148, 150 are housed at least partially within the isolating segment 152. As shown in FIG. 5, the outer structure is comprised by two isolating segments 152, each with a half-moon like cross section, and having internal surfaces 102, which define a slot or channel for receipt of the electrical segments 148, 150. FIG. 6 illustrates the electrical segments 148, 150 of a second embodiment of the invention. During assembly, the electrical segments 148, 150 are at least partially received by the surface 102. Alternate electrical and isolating segment components and assemblies are envisioned, such as isolating segments 152 that have integrated first and/or second electrical segments 148, 150.

Many other possible embodiments and configurations in addition to that shown in the above figures are contemplated by the present disclosure. For example, one embodiment of the invention contemplates alternate configurations of forward or reverse-biased diode sets that may provide for half-wave rectification. Another example may include a single electrical ring wherein both diode sets rectify the current to a single DC output. Yet another example of the invention contemplates using a self-contained oil system for cooling, or air for cooling. In yet another embodiment of the invention, the shaft tube 30 may be made from either a conductive or non-conductive material to achieve further cost reduction. Furthermore, a different example of the invention may forgo the shaft tube 30 altogether and provide for the rectifier assembly to be received directly into the rotatable shaft. Moreover, the design and placement of the various components may be rearranged such that a number of different in-line configurations could be realized.

One advantage that may be realized in the above embodiments is that the above described embodiments have superior weight and size advantages over the conventional type generator rectification systems. With the proposed rotating arrangement, current rectification can be achieved without the external space constraints of additional circuitry. Additionally, the construction and assembly of the rectifier will result in reduced maintenance downtime. Yet another advantage of the above embodiments is that the oil or coolant already present in the rotating shaft may be used to maintain the rectifier assembly, saving additional weight and size of a separate component. A further advantage of the above embodiments is that it reduces the risks of the diode bridge electrically shorting to a metallic shaft. Moreover, a high peripheral speed (up to 40,000 RPM), which is much higher than the 8,000-12,000 typically used for commercial aircraft, can be achieved due to the reduced centrifugal forces of moving the assembly closer to the common axis of rotation. The higher peripheral speed results in a lower generator electromagnetic weight.

When designing aircraft components, important factors to address are size, weight, and reliability. The above described rectifier assembly has a decreased number of parts as the system will be able to provide rectified DC outputs with minimal power conversion equipment, making the complete system inherently more reliable. This results in a lower weight, smaller sized, increased performance, and increased reliability system. The lower number of parts and reduced maintenance will lead to a lower product costs and lower operating costs. Reduced weight and size correlate to competitive advantages during flight.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rectifier assembly for placement within a rotating shaft of an electric machine assembly having a first machine providing an alternating current output and a second machine receiving a direct current input, with the rectifier assembly converting the alternating current output to the direct current input, the rectifier assembly comprising:
    opposing first and second conductive segments, each conductive segment having a substantially arcuate cross section;
    opposing first and second non-conductive segments, each non-conductive segment having a substantially arcuate cross section, and coupling the first and second conductive segments such that the arcuate cross sections of the first and second conductive segments and arcuate cross sections of the first and section non-conductive segments collectively define an annular elongated rectifier structure defining an interior and extend in a longitudinal direction, with the first and second conductive segments and the first and second non-conductive segments in a radially alternating adjacent arrangement in the annular rectifier structure;
    a set of diode seats axially arranged along the longitudinal direction and provided on each of the first and second conductive segments so as to face the interior, with a diode seat in one set being paired with a diode seat in the other set to define axially spaced pairs of diode seats;
    a biasing element overlying each of the diode seats; and
    a non-conductive support for each of the diode seats and holding the biasing element in position relative to the diode seat;
    wherein a diode seated on the diode seat is biased by the biasing element against the diode seat and held in place by the non-conductive support.

2. The rectifier of claim 1 further comprising an input bus bar for each of the pairs of diode seats.

3. The rectifier of claim 2 wherein the biasing element is integrated with the input bus bar.

4. The rectifier of claim 3 wherein the biasing element comprises two spaced spring fingers, with each spring finger forming the biasing element for one of diode seats of the paired diode seats.

5. The rectifier of claim 2 wherein the input bus bar is electrically isolated from the first and second conductive segments by the non-conductive segments.

6. The rectifier of claim 5 wherein at least a portion of the input bus bar is mounted to at least one of the non-conductive segments.

7. The rectifier of claim 1 further comprising an output bus bar for each of the first and second conductive segments.

8. The rectifier of claim 7 wherein at least one of the output bus bars is mounted to an end of one of the first and second conductive segments.

9. The rectifier of claim 1 wherein the non-conductive support is mounted to a face of the corresponding one of the first and second conductive segments within the interior.

10. The rectifier of claim 1 wherein the conductive and non-conductive segments have an arcuate outer surface, which collectively define a circle.

11. A rectifier assembly for placement within a rotating shaft of an electric machine assembly having a first machine providing an alternating current output and a second machine receiving a direct current input, with the rectifier assembly converting the alternating current output to the direct current input, the rectifier assembly comprising:
    multiple conductive segments;
    multiple non-conductive segments interposed between the multiple conductive segments to electrically separate the conductive segments and to form at least a portion of an elongated rectifier structure extending in a longitudinal direction and having an interior;
    a set of diode seats axially arranged along the longitudinal direction and provided on each of the conductive segments so as to face the interior;
    a biasing element overlying each of the diode seats; and
    a non-conductive support for each of the diode seats and holding the biasing element in position relative to the diode seat;
    wherein a diode seated on the diode seat is biased by the biasing element against the diode seat and held in place by the non-conductive support.

12. The rectifier of claim 11 further comprising at least one input bus bar providing AC power to at least one of the diode seats.

13. The rectifier of claim 12 wherein the biasing element is integrated with the input bus bar.

14. The rectifier of claim 13 wherein the biasing element comprises a spring finger.

15. The rectifier of claim 12 wherein the input bus bar is electrically isolated from the conductive segments by the non-conductive segments.

16. The rectifier of claim 15 wherein at least a portion of the input bus bar is mounted to at least one of the non-conductive segments.

17. The rectifier of claim 11 further comprising an output bus bar for each of the conductive segments.

18. The rectifier of claim 17 wherein at least one of the output bus bars is mounted to an end of one of the conductive segments.

19. The rectifier of claim 11 wherein the non-conductive support is mounted to a face of the corresponding one of the conductive segments within the interior.

20. The rectifier of claim 11 wherein the conductive and non-conductive segments have an arcuate outer surface, which collectively define a circle.

21. The rectifier of claim 11 wherein the interior of the rectifier assembly defines a passage for coolant to traverse.

22. The rectifier of claim 11 wherein the conductive segments dissipate heat generated by the diode.

23. The rectifier of claim 11 wherein the rectifier assembly is rotationally balanced.

\* \* \* \* \*